United States Patent
Green (10) Patent No.: US 10,338,233 B2
(45) Date of Patent: Jul. 2, 2019

(54) ASSURED VALIDATION OF CARRIER-PHASE INTEGER AMBIGUITIES FOR SAFETY-OF-LIFE APPLICATIONS

(71) Applicant: Coherent Technical Services, Inc., Lexington Park, MD (US)

(72) Inventor: Gary Nathan Green, Longview, TX (US)

(73) Assignee: COHERENT TECHNICAL SERVICES, INC., Lexington Park, MD (US)

( * ) Notice: Subject to any disclaimer, the term of this patent is extended or adjusted under 35 U.S.C. 154(b) by 317 days.

(21) Appl. No.: 15/485,780

(22) Filed: Apr. 12, 2017

(65) Prior Publication Data

US 2018/0299562 A1    Oct. 18, 2018

(51) Int. Cl.
*G01S 19/44* (2010.01)
*G01S 19/40* (2010.01)
*G01S 19/39* (2010.01)

(52) U.S. Cl.
CPC .............. *G01S 19/44* (2013.01); *G01S 19/39* (2013.01); *G01S 19/40* (2013.01)

(58) Field of Classification Search
CPC .......... G01S 19/44; G01S 19/39; G01S 19/40; G01S 19/48; G01S 19/42; G01S 19/09; G01S 19/05
USPC .................................................. 342/357.23
See application file for complete search history.

(56) References Cited

U.S. PATENT DOCUMENTS

| | | | | |
|---|---|---|---|---|
| 2009/0184869 A1* | 7/2009 | Talbot | ..................... | G01S 19/04 342/357.27 |
| 2009/0224969 A1* | 9/2009 | Kolb | ....................... | G01S 19/04 342/357.27 |
| 2011/0122020 A1* | 5/2011 | Henkel | ................... | G01S 19/44 342/357.27 |
| 2016/0320493 A1* | 11/2016 | Wu | ......................... | G01S 19/41 |

\* cited by examiner

*Primary Examiner* — Harry K Liu (74) *Attorney, Agent, or Firm* — Workman Nydegger (57) ABSTRACT

Embodiments are directed to performing integer ambiguity validation in carrier phase differential positioning and to calculating a protection level for safety-of-life applications. In one scenario, a computer system accesses double-differenced pseudorange measurements and carrier phase measurements which are combined to produce an estimate of the relative position between receivers. Integer bootstrapping is performed to produce fixed range ambiguity estimates that are integer multiples of a carrier signal wavelength. A validation threshold is then established based on a statistical model of the pseudorange and carrier wave measurements that ensures that a specified probability of correct ambiguity resolution is met. A data-driven validation is initiated on the difference between the float range ambiguity estimates and the fixed range ambiguity estimates to validate the correctness of the fixed range ambiguity estimate. Then, upon determining that the fixed range ambiguity estimates are valid, the estimate of the relative position between the receivers is corrected.

20 Claims, 9 Drawing Sheets

ASSURED VALIDATION OF CARRIER-PHASE INTEGER AMBIGUITIES FOR SAFETY-OF-LIFE APPLICATIONS

BACKGROUND

In the Global Navigation Satellite System (GNSS), two measurements are produced: 1) a pseudorange which is a noisy estimate of the full range between receivers and satellites, and 2) a carrier phase which is a much less noisy estimate of the change in range between the receivers and the satellites since the satellites were first tracked. Because the carrier phase only measures the change in range, it has an ambiguity with respect to the full range based on the initial range to the satellite.

When measurements from two receivers are combined in a double difference, the resulting range ambiguity is an integer multiple of the wavelength of the carrier signal. If this integer ambiguity can be correctly resolved, the carrier phase measurements can be used instead of the noisier pseudoranges, improving positioning accuracy. However, if the integer ambiguity is estimated incorrectly, then there will be a large bias in the position estimate. The integer ambiguity estimate must be validated prior to its use in position estimation.

Current methods of carrier phase integer ambiguity validation typically only use a statistical model to validate the quality of the integer ambiguity estimate without testing the actual measurements used to generate the estimate. Such a model-driven approach employs position domain integrity to assure the safety of the position estimate in the presence of potential incorrect integer ambiguity estimates. Such methods, however, do not eliminate the bias from the solution. Rather they only bound the error caused by the bias.

BRIEF SUMMARY

Embodiments described herein are directed to performing integer ambiguity validation in carrier phase differential positioning and to calculating a protection level for use in safety-of-life applications. In one embodiment, a computer system accesses a set of double-differenced pseudorange measurements of the ranges between a set of signal sources and a set of two or more receivers. These signal sources and receivers use a carrier signal that has a specified wavelength. The computer system accesses a set of double-differenced carrier phase measurements of the changes in range between the signal sources and the receivers with range ambiguities that are integer multiples of the wavelength of the carrier signal.

The computer system then combines the accessed pseudorange measurements and the carrier phase measurements. The combination results in an estimate of the relative position between the receivers and float range ambiguity estimates that are not integer multiples of the wavelength of the carrier signal. Integer bootstrapping is then performed to produce fixed range ambiguity estimates that are integer multiples of the wavelength of the carrier signal.

The computer system then establishes a validation threshold based on a statistical model of the pseudorange measurements and of the carrier phase measurements that ensures that a specified probability of correct ambiguity resolution is met and initiates a data-driven validation on the difference between the float range ambiguity estimates and the fixed range ambiguity estimates to validate the correctness of the fixed range ambiguity estimate. Then, upon determining that the fixed range ambiguity estimates are valid, the computer system corrects the estimate of the relative position between the receivers.

In another embodiment, a computer system performs a method for calculating a protection level for use in safety-of-life applications. The method includes accessing a statistical model of errors in float relative position estimates and in float range ambiguity estimates. The method also includes accessing ambiguity residual values each representing the difference between a float range ambiguity estimate and fixed range ambiguity estimate, accessing float relative position estimates, and correcting the accessed float relative position estimate based on the accessed ambiguity residual values.

The method further includes accessing a record of which fixed range ambiguity estimates have been validated, calculating a relative position error caused by the fixed range ambiguity estimates that were recorded to be invalid, and calculating the a posteriori probability of correct fix of the fixed range ambiguity estimates based on the size of the calculated difference between the float range ambiguity estimate and the fixed range ambiguity estimates and corresponding variances in the accessed statistical model. Still further, the method includes calculating a variance value for the corrected float relative position estimate and computing a protection level indicating that the probability that the relative position error for the corrected float relative position estimate exceeds the protection level is less than a specified amount.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

As noted above, embodiments described herein are generally directed to performing integer ambiguity validation in carrier phase differential positioning and to calculating a protection level for use in safety-of-life applications. In one embodiment, a computer system accesses a set of double-differenced pseudorange measurements of the ranges between a set of signal sources and a set of two or more receivers. These signal sources and receivers use a carrier signal that has a specified wavelength. The computer system accesses a set of double-differenced carrier phase measurements of the changes in range between the signal sources and the receivers with range ambiguities that are integer multiples of the wavelength of the carrier signal.

The computer system then combines the accessed pseudorange measurements and the carrier phase measurements. The combination results in an estimate of the relative position between the receivers and float range ambiguity estimates that are not integer multiples of the wavelength of the carrier signal. Integer bootstrapping is then performed to produce fixed range ambiguity estimates that are integer multiples of the wavelength of the carrier signal.

The computer system then establishes a validation threshold based on a statistical model of the pseudorange measurements and of the carrier phase measurements that ensures that a specified probability of correct ambiguity resolution is met and initiates a data-driven validation on the difference between the float range ambiguity estimates and the fixed range ambiguity estimates to validate the correctness of the fixed range ambiguity estimate. Then, upon determining that the fixed range ambiguity estimates are valid, the computer system corrects the estimate of the relative position between the receivers.

In another embodiment, a computer system performs a method for calculating a protection level for use in safety-of-life applications. The method includes accessing a statistical model of errors in float relative position estimates and in float range ambiguity estimates. The method also includes accessing ambiguity residual values each representing the difference between a float range ambiguity estimate and fixed range ambiguity estimate, accessing float relative position estimates, and correcting the accessed float relative position estimate based on the accessed ambiguity residual values.

The method further includes accessing a record of which fixed range ambiguity estimates have been validated, calculating a mean relative position error caused by the fixed range ambiguity estimates that were recorded to be invalid, and calculating the a posteriori probability of correct fix of the fixed range ambiguity estimates based on the size of the calculated difference between the float range ambiguity estimate and the fixed range ambiguity estimates and corresponding variances in the accessed statistical model. Still further, the method includes calculating a variance value for the corrected float relative position estimate and computing a protection level indicating that the probability that the relative position error for the corrected float relative position estimate exceeds the protection level is less than a specified amount.

The following discussion refers to a number of methods and method acts that may be performed by one or more embodiments of the subject matter disclosed herein. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems (e.g. a cloud computing environment). In a cloud computing environment, program modules may be located in both local and remote memory storage devices.

As described herein, a computing system may also contain communication channels that allow the computing system to communicate with other message processors over a wired or wireless network. Such communication channels may include hardware-based receivers, transmitters or transceivers, which are configured to receive data, transmit data or perform both. Embodiments described herein also include physical computer-readable media for carrying or storing computer-executable instructions and/or data structures. Such computer-readable media can be any available physical media that can be accessed by a general-purpose or special-purpose computing system.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
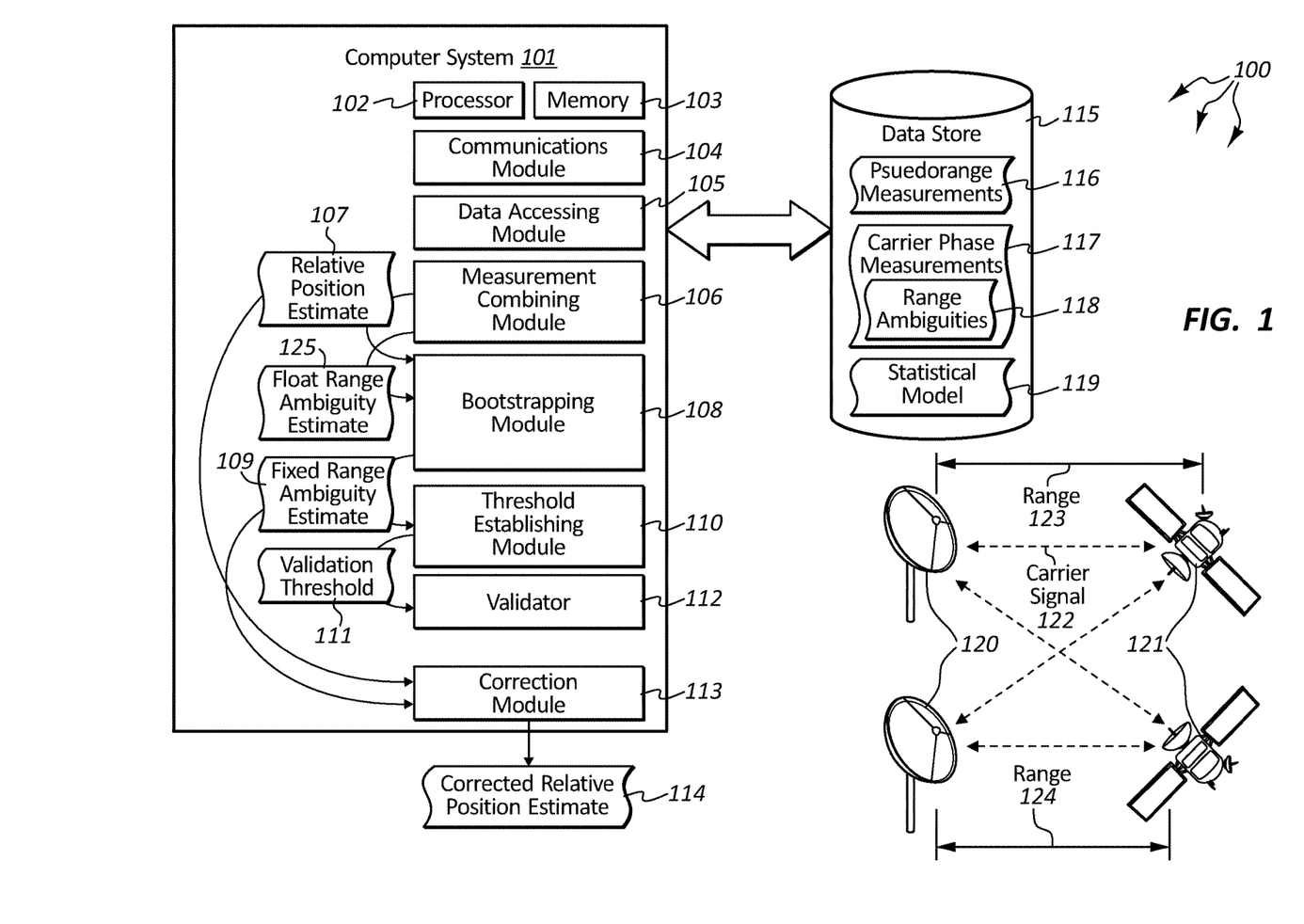
FIG. 1 illustrates a computer architecture in which embodiments described herein may operate including performing integer ambiguity validation in carrier phase differential positioning.

Referring to the figures, FIG. 1 illustrates a computer architecture 100 in which at least one embodiment described herein may be employed. The computer architecture 100 includes a computer system 101. The computer system 101 includes at least one processor 102 and at least some system memory 103. The computer system 101 may be any type of local or distributed computer system, including a cloud computer system. The computer system 101 includes modules for performing a variety of different functions. For instance, communications module 104 may be configured to communicate with other computer systems, modules or hardware systems such as data store 115. The communications module 104 may include any wired or wireless communication means that can receive and/or transmit data to or from other systems. The communications module 104 may be configured to interact with databases, mobile computing devices (such as mobile phones or tablets), embedded or other types of computer systems.

For example, the computer system 101 may be configured to implement communications module 104 to communicate with data store 115, which may be local or remote. The data store 115 may use wired or wireless communication means such as Ethernet cards, WLAN cards, WiFi cards, Bluetooth cards or other hardware radios to communicate with the data store 115 or with other data storage or computing systems. The computer system 101 may use the data accessing module 105 to access pseudorange measurements 116, carrier phase measurements 117, statistical models 119 or other data in the data store 115. It should be noted that each module in the computer system 101 may include its own hardware and/or software, and may be configured to operate independently of the other computer system components. Other modules will be described herein below with reference to the following description.

As mentioned previously, model-driven integer ambiguity validation methods are currently in use for safety-of-life applications. In contrast to model-driven validation, data-driven validation methods perform a test on the measurements themselves to validate the correctness of the integer ambiguity estimate. Existing data-driven methods of integer ambiguity validation rely on approximations for setting the validation thresholds. These numerical approximations are not appropriate for safety-of-life applications such as flight navigation systems or other guidance systems on which a user may rely with his or her life. Furthermore, in the event that existing data-driven methods invalidate an integer estimate, no position estimate is able to be provided with assurance.

In contrast to existing data-driven methods that rely on approximations for setting the validation thresholds, the methods described herein use an analytically closed form method for setting the validation thresholds that provably satisfies a required probability of correct ambiguity fix, thus making them appropriate for use in safety-of-life applications. Further, the embodiments herein accurately bound position estimation errors induced by invalidated integer ambiguity estimates when the ambiguity estimates fail the validation test. Additionally, embodiments generalize the validation test to allow for validation of subsets of the integer ambiguities.

Navigation performance for carrier-phase differential GPS (CDGPS) systems increases with each new application. Performance is assessed in terms of integrity, accuracy, continuity, and availability. Integrity is specified in terms of integrity risk (IR), the probability that the solution error exceeds an alert limit (AL) without warning. Accuracy can be specified in terms of quantiles of interest, such as 95% accuracy, which refers to the error volume within which 95% of solutions fall. Continuity risk (CR) is the probability that the solution will become unavailable during a critical exposure interval given that it was available at the beginning of that interval. Availability is the percentage of time that the solution satisfies its required integrity, accuracy, and continuity requirements.

The ground-based augmentation system (GBAS), originally specified as a landing aid for large runways on land, specified ALs of 10 m with IR on the order of 10^-7 per approach. This leads to a relatively loose 95% accuracy requirement of 2 m for a zero-mean-error Gaussian distributed solution, which can be met by a float CDGPS solution. More recent navigation system applications, such as landing aboard an aircraft carrier and a recent demonstration of autonomous aerial refueling, have meter-level ALs, IR on the order of 10^-6, and decimeter-level accuracy requirements. Such a stringent performance specification can only be met by CDGPS positioning when the integer ambiguities are resolved. Similar precision (or even higher precision) is required for use with unmanned aerial vehicles (UAVs). Thus, the embodiments described herein allow precise control over the risk of incorrect ambiguity resolution, while reducing and bounding any residual biases in the relative navigation solution.

In contrast to the model-driven approach, data-driven methods decide a posteriori whether to accept a fixed or float solution. Conditioning the selection on the observed measurements reduces the risk of incorrect ambiguity resolution. A subset of data-driven methods is called integer aperture (IA) estimation. In IA methods, the integer ambiguity is estimated using either bootstrapping or integer least squares (ILS), after which a test statistic is computed using the ambiguity residual, i.e., the difference between the float and fixed ambiguities. This test statistic is compared to a threshold to decide between the fixed and float solution.

One IA method is IA bootstrapping (IAB), which resolves the integer ambiguities via integer bootstrapping and then tests the fixed solution by applying bootstrapping to a scaled-up version of the ambiguity residual. In some embodiments, if the test returns the zero vector, then the fixed solution is selected; otherwise the float solution is selected. IAB is beneficial in that its probabilities have analytically computable values, which allows the decision threshold to be set analytically and, more generally, enables the strict performance requirements that safety-of-life applications demand to be provably satisfied.

Other IA methods use ILS to solve for the integer ambiguity, which is optimal in the maximum likelihood sense for Gaussian measurement noise. Ellipsoidal IA uses the covariance weighted norm of the ILS ambiguity residual as a test statistic. The simplicity of this statistic allows the decision threshold to be set analytically, as with IA bootstrapping. Other ILS-based IA methods may also be used that employ test statistics that are a function of the ambiguity residuals of the ILS fix and of one or more alternate fixes with the next lowest cost. These methods include the ratio test, the difference test, and an optimal test. Unlike IA bootstrapping and ellipsoidal IA, none of these methods' test statistics has an analytical probability distribution or decision threshold. Methods that set thresholds to control the risk of incorrect fix based on the (time-varying) measurement model are used to control IR. Such methods include threshold determination via Monte Carlo simulation, lookup tables, and functional approximations.

The Monte Carlo simulations, lookup tables, and functional approximations that are used to set aperture thresholds in the ILS-based IA methods are inapt for safety-of-life systems. The thresholds that result from these methods cannot be analytically proven to bound the risk of incorrect fix for particular models. At best, they incorporate sufficient conservatism to protect the solution at the expense of decreased availability. Also, Monte Carlo simulations particular to the measurement model in use are not feasible for a real-time solution.

The optimal IA algorithm uses as a test statistic the a posteriori probability of correct fix. Contrary to intuition, the threshold for a particular probability of incorrect ambiguity resolution for this statistic is not analytically computable. Also, the optimal IA estimator involves an infinite sum over all possible integer ambiguities. The search can be truncated once a sufficiently large number of integer fixes has been evaluated, but the number required depends on strength of the model and on the required IR required. The search often extends to several hundred candidate fixes in realistic simulations to satisfy the most demanding integrity requirements, which becomes impractical for real-time applications.

When IA estimators are extended from resolution of the full set of integer ambiguities to subsets of the full set, they are called Generalized Integer Aperture (GIA) estimators. If the full set of ambiguities is unable to be fixed, these algorithms evaluate successively smaller subsets until either a satisfactory fix is found or the float solution is applied as a last resort. Partial ambiguity resolution offers gradual degradation of performance for weak models. The embodiments described herein thus provide data-driven ambiguity resolution and validation method whose decision threshold for choosing between a fixed and float solution can be set analytically. The method is generalized to accommodate partial ambiguity resolution, and correctly characterizes the distribution of the data-driven, partially-fixed baseline.

Various improvements over existing methods are described, including at least three specifically mentioned below. First, IAB is extended to encompass partial ambiguity resolution. The extended technique will be referred to herein as Generalized Integer Aperture Bootstrapping (GIAB). Second, an analytical characterization of the a priori and a posteriori distributions of the GIAB baseline is described and validated. Third, a method for setting the integer aperture size and shape is developed that maximizes solution availability subject to a constraint on the risk of incorrect ambiguity resolution.

Integer bootstrapping operates by sequentially rounding one integer ambiguity and conditioning the remaining float ambiguities on the assumption that the preceding fixes were all correct. IB may be used in conjunction with a de-correlating Z-transform of a LAMBDA method to increase the probability of success. A float integer ambiguity may be modeled as the true ambiguity plus zero-mean Gaussian noise. The IB algorithm proceeds by alternately rounding and then performing conditioning steps. First, the ambiguity with the lowest variance is rounded to the nearest integer. Next, the first ambiguity residual is computed and used to condition the remaining float ambiguities. These steps are repeated for the remaining ambiguities one by one: The ambiguity with the lowest conditional variance is rounded, the conditioned residual is computed, and the rest of the ambiguities are further conditioned. The use of the ambiguity decorrelation Z-transform and an $LDL^T$ decomposition ensures that the transformed integers are ordered such that fixing from first to last is the correct order.

Figure 2:
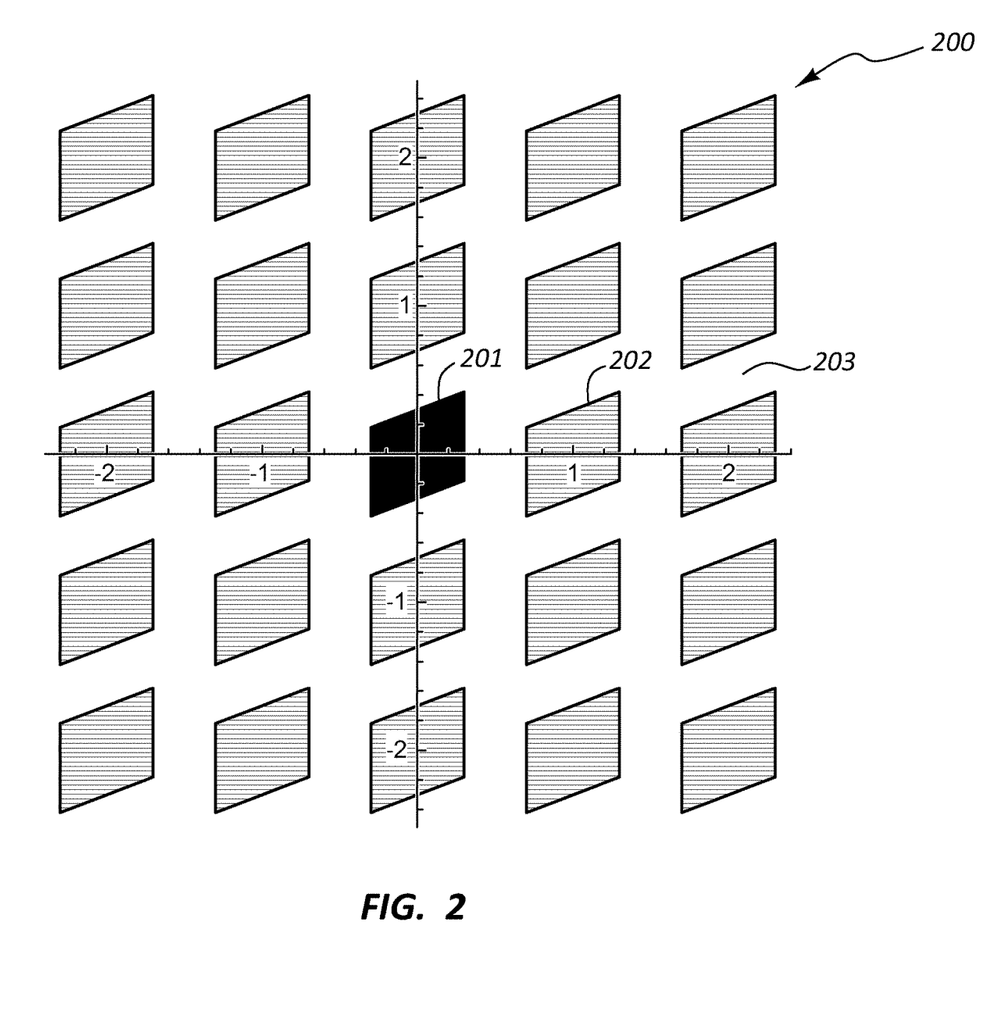
FIG. 2 illustrates a chart representing aperture regions for integer aperture bootstrapping in a two-dimensional covariance model.

Integer Aperture Bootstrapping (IAB) extends the IB concept to create a validation test that computes its test statistic using an ambiguity residual. In the event that the fix is rejected, IAB resorts to the float solution. The IAB decision rule can be interpreted as follows: If the IB algorithm is applied to a scaled-up version of the ambiguity residual and the result is the zero vector, then the ambiguity fix is accepted; otherwise, the fix is rejected. The IAB decision rule has a pull-in region (PIR) shrunken by a specified factor, as illustrated in FIG. 2. The PIR is the region around an integer vector for which the estimator returns that integer. Critical aperture regions 201 are illustrated in FIG. 2 for integer aperture bootstrapping. The two-dimensional covariance model 200 of FIG. 2 is a visual representation of the results of IAB when applied to a set of ambiguities. The central, darkly shaded region 201 is the success region, and the lightly shaded regions 202 correspond to incorrect ambiguity fixes. When the ambiguity residual is in the unshaded region, the fix is rejected.

FIG. 2 shows three regions that correspond to three possible outcomes for an IA estimator. The central, dark region 201 corresponds to the event defined as "success" in which the full ambiguity set is resolved without error. The union of the various lightly shaded regions 202 corresponds to the "failure" event in which one or more of the integer ambiguities is fixed incorrectly. Values in the unshaded region 203 represent results in the fix that were rejected. This event is called "undecided."

A few important observations should be made about the event probabilities. First, the probability of failure (PF), involves an infinite sum over all integer ambiguities other than the correct ambiguity. This can be approximated by summing over a large number of alternative ambiguities, but this may still be computationally expensive if the desired PF is small or if the number of ambiguities is large. Second, PF is a monotonically increasing function, indicating that the risk of failure decreases as the integer aperture is made smaller. Thus, the aperture parameter controls the exposure to failure risk.

To generalize IAB to partial ambiguity resolution, each ambiguity is fixed and validated successively by examining the magnitude of its conditional ambiguity residual. Since each ambiguity has a different conditional variance, each ambiguity is processed separately. The benefits of element specific processing are described below. The number of ambiguity fixes which pass the validation test may be noted. The GIAB algorithm results in either fixed values or values that are left floating. As such, failure is defined as the acceptance of any incorrect integers, and success cases are defined for each possible number of integer fixes, provided no ambiguity is fixed incorrectly.

To predict algorithm performance, the probability of each possible event is computed. For each integer that is reached by the GIAB algorithm, there are three possibilities: the fix is accepted correctly, the fix is rejected, or the fix is accepted erroneously. Using these bounds, the overall event probabilities can be obtained and bounded. A failure event can be caused by any single fixing error. If there are multiple errant fixes, there is still only a single failure event as defined earlier. As such, the failure probability upper bound can be computed.

Figure 3:
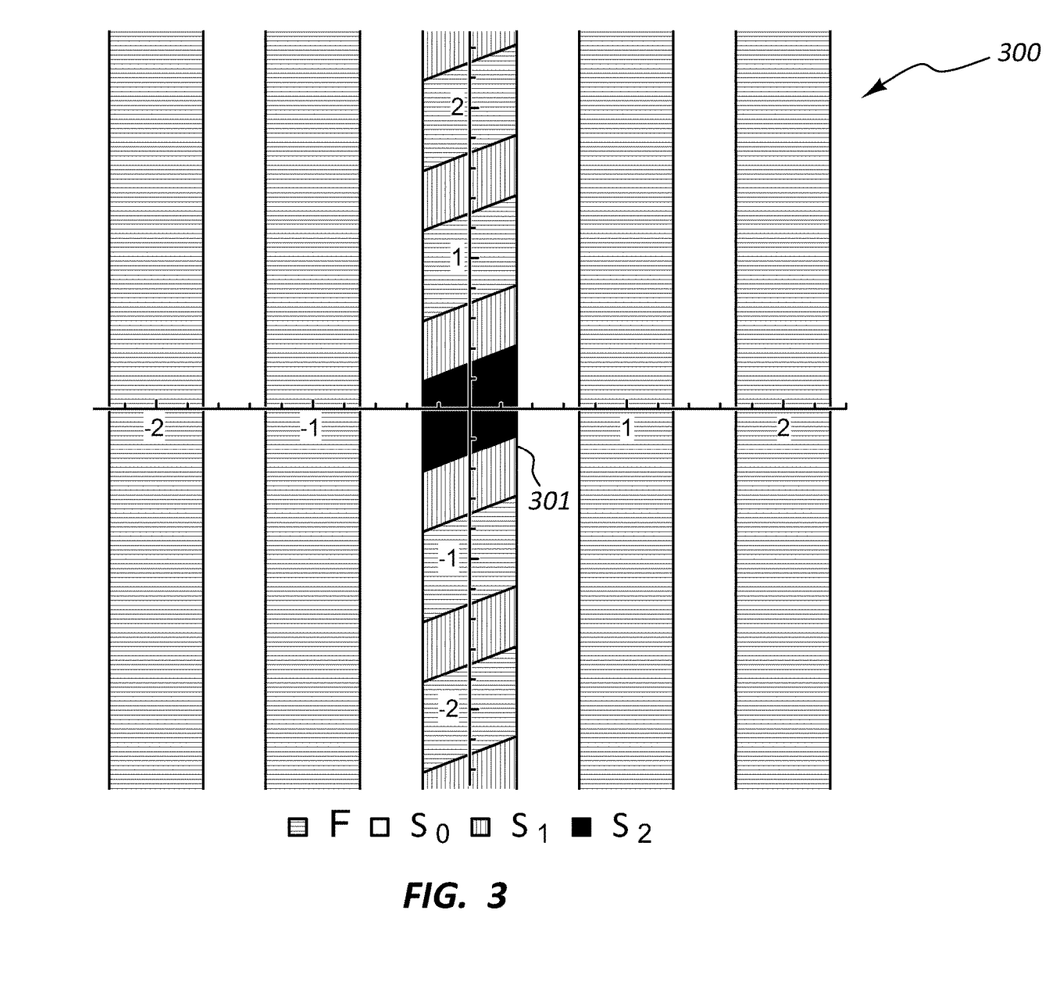
FIG. 3 illustrates events and pull-in regions for Generalized Integer Aperture Bootstrapping (GIAB).

Chart 300 of FIG. 3 illustrates pull-in regions 301 and associated events for GIAB. Event F results if one or more of the ambiguities is fixed incorrectly. Event Si occurs when exactly i ambiguities are fixed and all ambiguities are fixed correctly. To assess the performance of the GIAB algorithm, both the a priori and a posteriori distributions are characterized. These distributions will be developed in a three step process. First, the a posteriori distribution is developed when conditioned on the event that at least some fixes were correct, and on the value of the $i+1^{st}$ conditional ambiguity residual failed the threshold test. Next, the distribution of the partially fixed baseline conditioned only on the number of ambiguities fixed by GIAB is derived. Finally, the a priori distribution of GIAB will be developed by removing the conditioning on the number of integers fixed.

The first distribution will be referred to as the posterior distribution. It is the distribution that is used by a real-time implementation to bound the IR of the algorithm. The second distribution is referred to as the intermediate distribution. It is a mathematical construct used to reach the third distribution, which is called the prior distribution. The prior distribution can be used to analyze the average performance of the algorithm. As a first step toward developing the a posteriori baseline error distribution, consider an event Si in terms of the values of the conditional ambiguity residuals, and the aperture threshold value. Assuming that has been set to control PF to an acceptable level, whenever the conditional ambiguity residual exceeds the threshold, that integer cannot be fixed without incurring an unacceptable risk. Further, if specified bounds are used, the risk of the incorrect fix being wrong by more than 1 is negligible.

According to the partial fixing procedure, the float baseline will have been conditioned upon a set of ambiguities. For a particular value that exceeds the threshold, the conditional maximum a posteriori ambiguity fix is that produced by integer bootstrapping. However, this integer fix cannot be assumed without violating the probability of failure. In general, there will be a position domain bias in the baseline computed by leaving at least some ambiguities unfixed. That is, if some ambiguities are invalidated and left floating, it is an invalid—and potentially hazardous—assumption that the resulting solution is unbiased.

The effect of these biases must be addressed in the position domain if the integrity of the CDGPS solution is to be protected. This fact motivates at least three variations of GIAB that differ in how the ambiguity that exceeds the aperture threshold is handled. The first variation, termed float GIAB, will leave the unsatisfactory ambiguity as a real-valued estimate. In float GIAB, the integrity risk due to the residual bias is explicitly taken into account. The second variation, called maximum a posteriori (MAP) GIAB, will accept the most likely fix candidate, but integrity risk from the alternate fix and its position domain bias is monitored. In these embodiments, unlike in current model-driven approaches, there is no need to search a large set of alternative fixes since there is only a single non-negligible alternative fix candidate.

The third variation is minimum mean square error (MMSE) GIAB. In MMSE GIAB, a weighted average of the maximum a posteriori (MAP) GIAB solution and the alternative fixed solution is computed. When the MAP fix is much more likely than the alternative, MMSE GIAB will differ only slightly from the MAP GIAB solution. In the unlikely event that the two candidate fixes are equally likely, the MMSE GIAB baseline will equal the float GIAB baseline. Event probabilities are the a posteriori fixing probabilities (as opposed to a priori probabilities used by current solutions), and as such, there is only a single alternative fix that is to be considered, and that there will be a bias in the most likely case if float GIAB or MMSE GIAB are used. For each of the three versions of GIAB, there will be two primary models. This means that the distributions can be modeled as Gaussian mixture models.

The modal biases result from the invalidated ambiguities. The two models have the same covariance since they result from conditioning on the same set of ambiguities. The covariance of the baseline conditioned upon these ambiguities is computed using the submatrices of the covariance matrices that correspond to those ambiguities. Next, the biases of the three solution varieties are determined.

Figure 4:
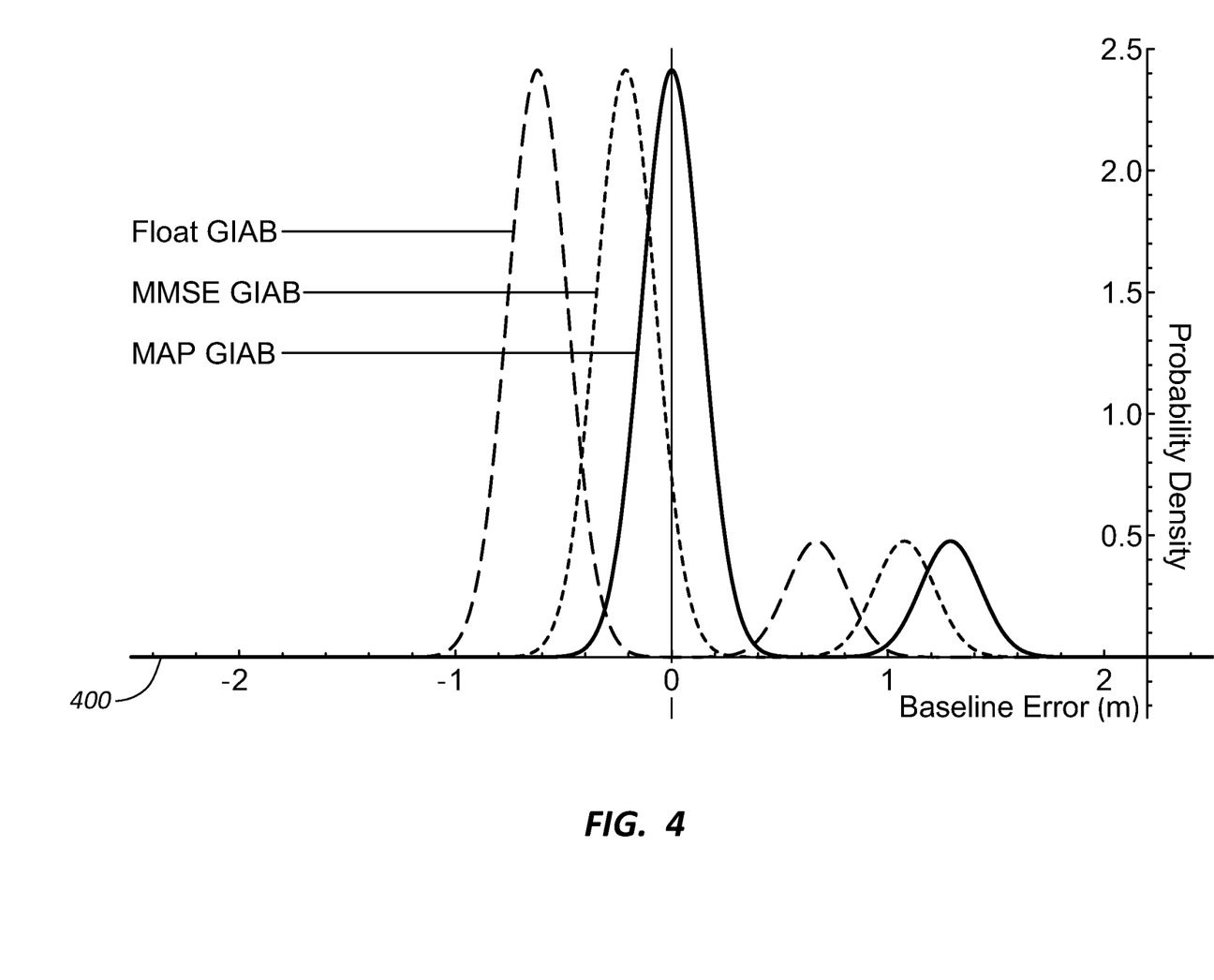
FIG. 4 illustrates a chart with example distributions of components of a partially fixed baseline error for various GIAB implementations.

The posterior distributions of the errors in one dimension of the fixed baseline are plotted for the three variations of GIAB in chart 400 of FIG. 4. This example shows results from a very large ambiguity residual so that the MMSE and MAP distributions (401 and 402, respectively) are visibly distinct. The intermediate distribution can now be computed by removing the conditioning upon the particular ambiguity residual. In some embodiments, the probability density function implemented is the Gaussain density function, normalized for the support of the event.

Figure 5:
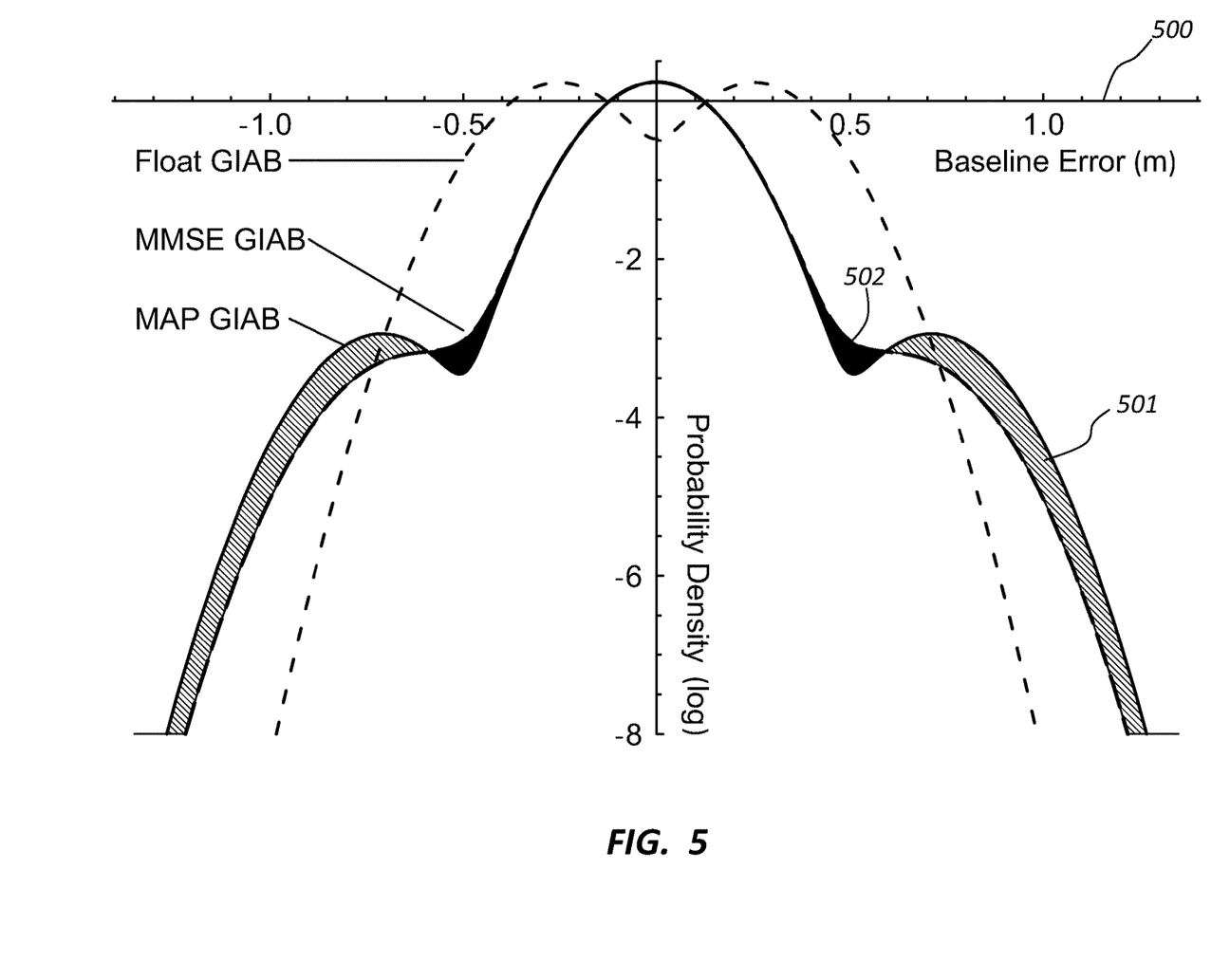
FIG. 5 illustrates a chart with example intermediate distributions of GIAB values plotted on a log scale.

Intermediate distributions for float, MAP, and MMSE GIAB baselines are shown in chart 500 of FIG. 5. Indeed, FIG. 5 illustrates intermediate distributions of float, MAP, and MMSE GIAB when at least one ambiguity is invalidated, plotted in log scale. Float GIAB has a symmetric, bimodal distribution. MAP GIAB has a symmetric trimodal distribution with a dominant, zero-mean error central mode. MMSE GIAB has lower probabilities of large errors than does MAP GIAB at the expense of a slight increase in the probability of moderately sized errors. In the lightly shaded region 501, MAP GIAB has higher density. In the darker region 502, MMSE GIAB has higher density.

Figure 6:
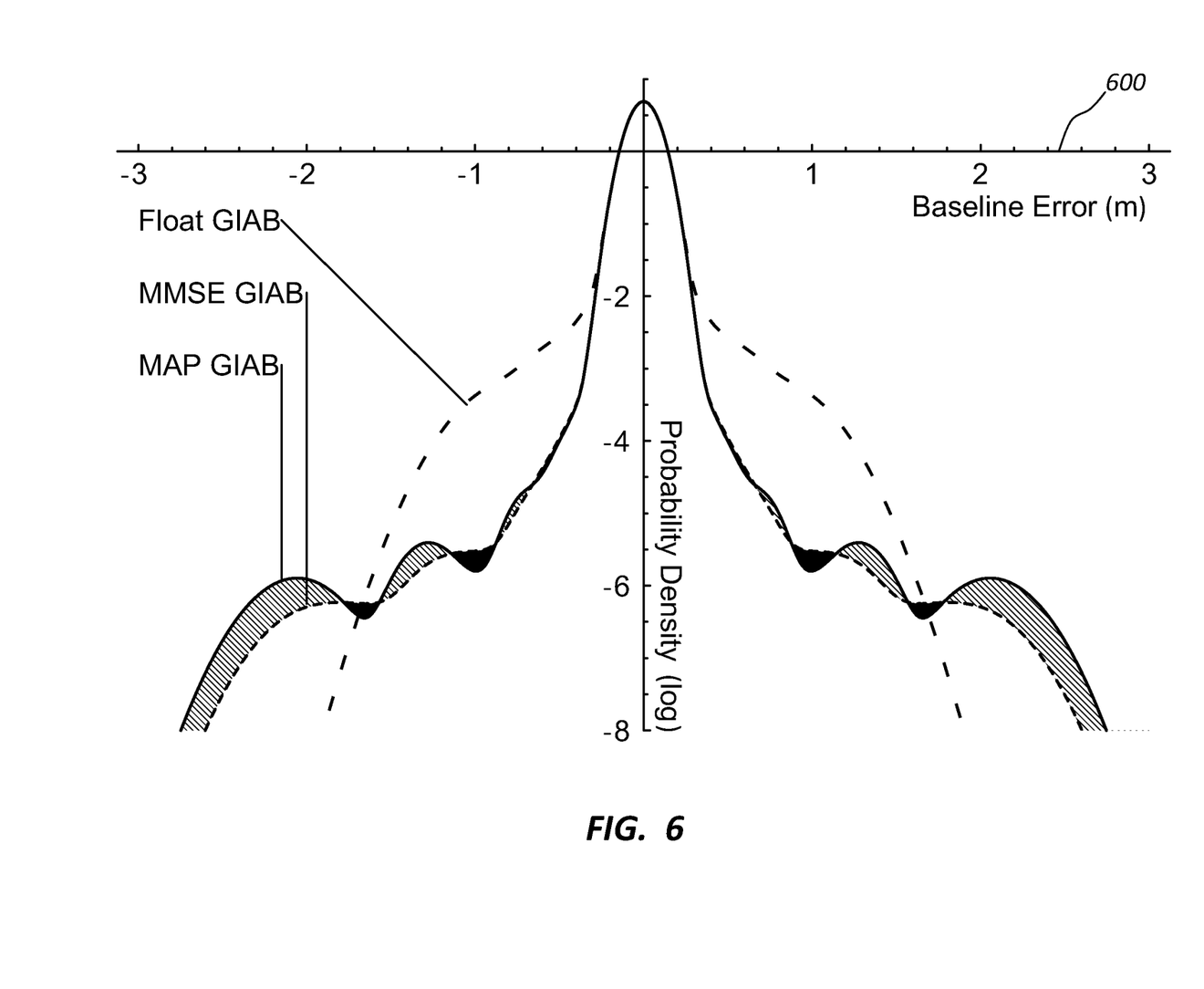
FIG. 6 illustrates a chart with alternative example distributions of GIAB values plotted on a log scale.

Using fixing probabilities and a partially fixed covariance and an intermediate distribution, the final a priori distribution may be obtained. This distribution is a Gaussian mixture model. This is illustrated in FIG. 6. Indeed, chart 600 of FIG. 6 illustrates prior distributions of float, MAP, and MMSE GIAB, plotted in log scale. Float GIAB has a weak central mode with strong, but narrow secondary peaks. MAP and MMSE GIAB both have a strong central mode and secondary peaks that are wider, but weaker than those of float GIAB. MMSE GIAB has smoother and narrower secondary peaks than MAP GIAB.

In IAB, a single threshold parameter is used to control the probability of failure with the probability of success falling out as an uncontrolled result. The fact that GIAB permits partial ambiguity resolution enables greater flexibility in setting the size and shape of the integer aperture than in IAB. If multiple different thresholds are set, this allows some control in the resulting probability of success for any desired PF. The thresholds can be set by allocating a portion of the total specified PF to each ambiguity, and further computing the thresholds as a function of the allocated probability and the conditional variance of the ambiguity.

Thus, a new data-driven CDGPS partial ambiguity resolution and validation algorithm has been developed analytically and has been further validated with Monte Carlo simulation. This algorithm has advantages over the state-of-the-art in that (1) data-driven methods offer improved availability of integrity over model-driven methods, (2) the integrity risk due to incorrect fixing is precisely controlled analytically as compared to functional approximation methods used with the ratio test and similar integer aperture methods, (3) it correctly accounts for the integrity risk of partial ambiguity resolution in the position domain that existing GIA methods neglect, and (4) it requires less computational burden than existing solutions since it eliminates the search for many alternate fix candidates. This algorithm has been shown to provide superior performance to the current state-of-the-art methods for a range of measurement models. These concepts will be explained further below with regard to methods 700 and 900 of FIGS. 7 and 9, respectively.

Figure 7:
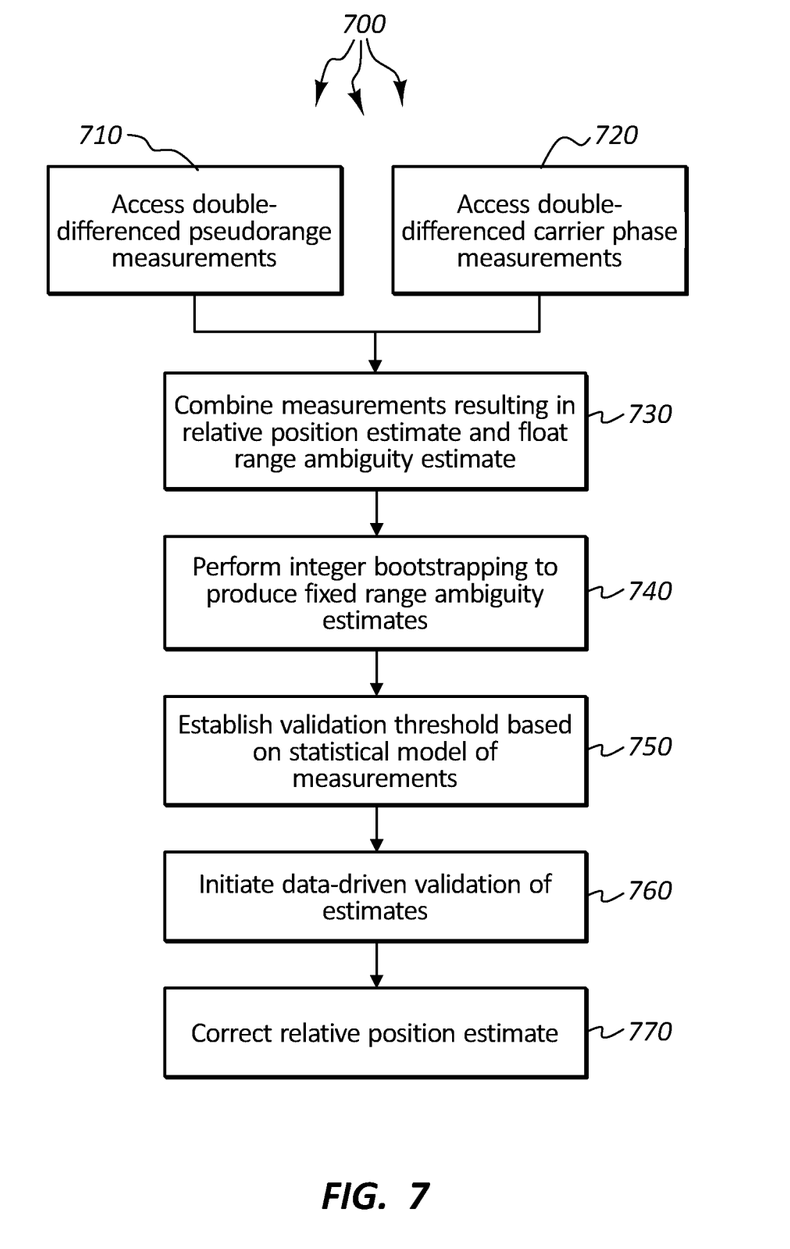
FIG. 7 illustrates a flowchart of an example method for performing integer ambiguity validation in carrier phase differential positioning.
Figure 9:
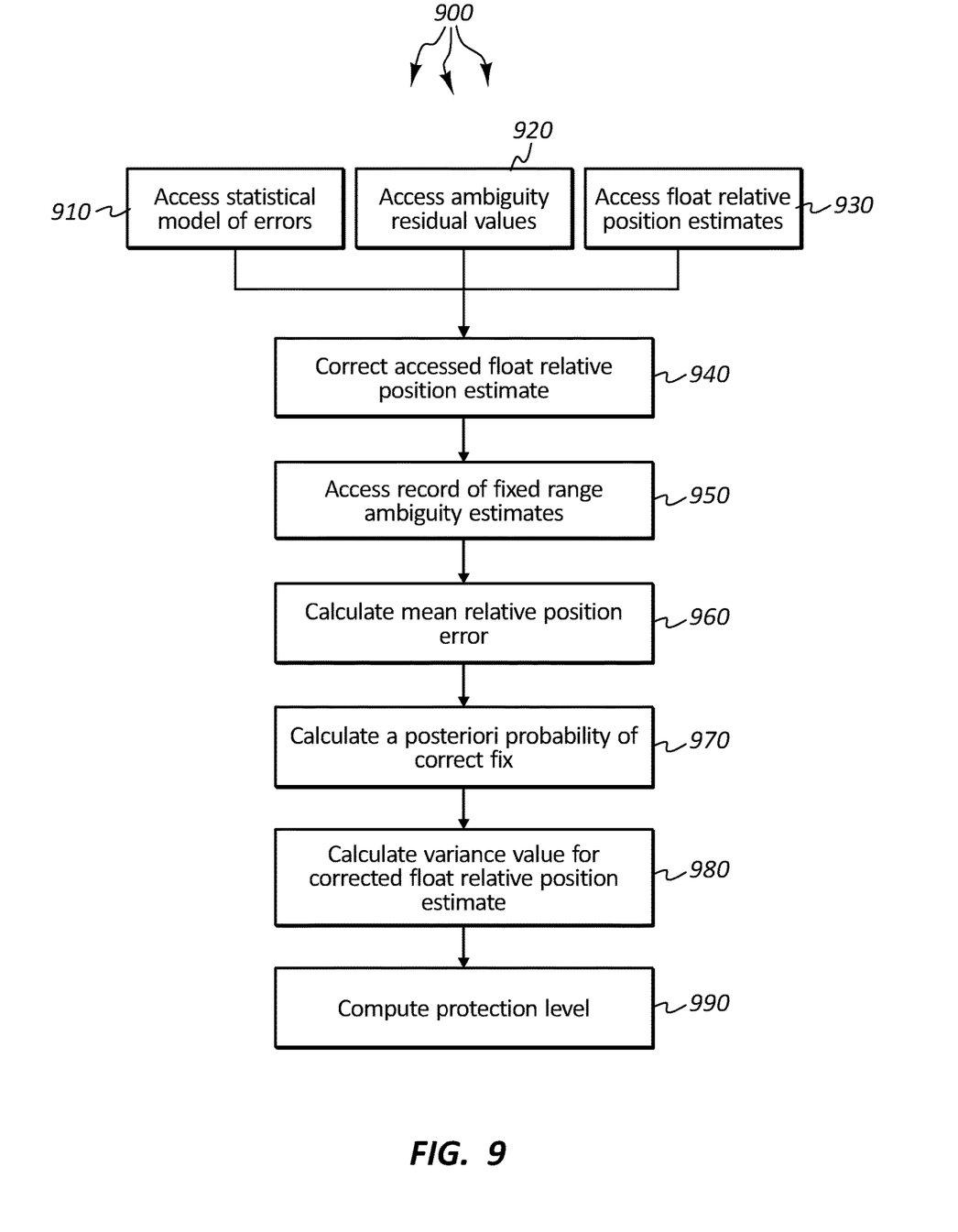
FIG. 9 illustrates a flowchart of an example method for calculating a protection level for use in safety-of-life applications.

In view of the systems and architectures described above, methodologies that may be implemented in accordance with the disclosed subject matter will be better appreciated with reference to the flow charts of FIGS. 7 and 9. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 7 illustrates a flowchart of a method 700 for performing integer ambiguity validation in carrier phase differential positioning. The method 700 will now be described with frequent reference to the components and data of environment 100 of FIG. 1.

Method 700 includes accessing a set of double-differenced pseudorange measurements of the ranges between a set of signal sources and a set of two or more receivers, where the signal sources and the receivers use a carrier signal having a specified wavelength (710). For example, data accessing module 105 of computer system 101 may access pseudorange measurements 116 stored in data store 115. The data store 115 may be local to computer system 101, or may be remotely accessed via a wired or wireless connection.

The pseudorange measurements describe the ranges between the receivers and the signal sources (e.g. ranges 123 and 124). As noted above, the double-differencing operation results in values that have an integer difference in the wavelength of the carrier signal 122. Although shown in FIG. 1 as being satellites (signal sources 121) and satellite dishes (receivers 120), it will be understood that other signal sources or receivers may be used in addition to or as a replacement thereof. The signal sources and receivers communicate over a carrier signal 122 that has a specified wavelength. This carrier signal is modulated to transmit data between source and receiver.

Method 700 next includes accessing a set of double-differenced carrier phase measurements of the changes in range between the signal sources and the receivers with range ambiguities that are integer multiples of the wavelength of the carrier signal (720). The data accessing module 105 may access carrier phase measurements 117. These may be stored values or may be received directly from the measurement devices. The carrier phase measurements 117 represent the changes in range between the signal sources 121 and the receivers 120. The carrier phase measurements 117 include range ambiguities 118 that are integer multiples of the wavelength of the carrier signal 122.

The measurement combining module 106 of computer system 101 then combines the accessed pseudorange measurements and the carrier phase measurements (730). The combination of measurements results in an estimate of the relative position 107 between the receivers and float range ambiguity estimates 125 that are not integer multiples of the wavelength of the carrier signal. Integer bootstrapping is performed by module 108 to produce fixed range ambiguity estimates 109 that are integer multiples of the wavelength of the carrier signal (740). Once the fixed range ambiguity estimates 109 have been generated by the bootstrapping module 108, the threshold establishing module 110 establishes a validation threshold 111 based on a statistical model 119 of the pseudorange measurements and of the carrier phase measurements that ensures that a specified probability of correct ambiguity resolution is met (750).

The statistical model 119 may be stored in data store 115 or in another location. The statistical model may be a multivariate Gaussian distribution, and any statistical tests performed within the system may be performed using such a model. The validation threshold 111 established using a statistical model is used to set a baseline for ambiguity resolution. As mentioned above, range ambiguities (e.g. 118) are to be resolved in a manner that is fit for use in a safety-of-life application. Fixed range ambiguity estimates are produced during integer bootstrapping. This process may include accessing an error model to determine which float range ambiguity estimate value 125 has the highest confidence level.

Once the estimate value with the highest confidence level has been identified, the bootstrapping process iteratively rounds the most confident float range ambiguity estimate value 125 to the nearest integer, and then conditions the remaining range ambiguity estimates starting with the estimate value with the highest determined confidence level. The conditioning includes updating later float range ambiguity estimates based on the previously rounded integer values resulting from integer bootstrapping. The validation threshold 111 that was established ensures that a sufficiently high probability of correct ambiguity resolution is achieved subject to a specified maximum probability of incorrect ambiguity resolution. If the probability is met, the range changes can be trusted and used in safety-of-life applications.

Method 700 further includes initiating a data-driven validation on the difference between the float range ambiguity estimates and the fixed range ambiguity estimates to validate the correctness of the fixed range ambiguity estimates (760) and, upon determining that the fixed range ambiguity estimates are valid, the system corrects the estimate of the relative position between the receivers (770). The validator 112 of computer system 101 performs a data-driven validation on the difference between the float range ambiguity estimates and the fixed range ambiguity estimates 109 to determine whether the fixed range ambiguity estimates are valid.

In some embodiments, validating the correctness of the fixed range ambiguity estimates 109 may include performing a statistical test to determine the probability of incorrectly rounding a selected integer. That probability needs to be sufficiently low to ensure that an incorrect rounding is not performed. Each fixed range ambiguity value may be assigned its own validation threshold value. As such, range ambiguities are resolved individually, where each has its own validation threshold.

Moreover, a total risk value may be assigned for integer range ambiguity validations that are to be performed in a safety-of-life application. For instance, it may be known that a maximum risk value is associated with a given application (e.g. a flight navigation system). Beyond that total risk value, the application may become unsafe and, as such, integer range ambiguity validations may invalidate an ambiguity as having a risk level that is too high. In some cases, the total risk value may be divided and assigned to each fixed range ambiguity estimate, so that each fixed range ambiguity estimate has its own risk value. Thus, the risk can be cumulative or individualized. In such cases, the validation threshold 111 may be determined sequentially for each accessed ambiguity residual value according to the allocated portion of the total risk, and may further be determined based on a modeled variance value that indicates the expected uncertainty in the conditioned float range ambiguity.

If the estimates are determined to be valid by the validator 112, the correction module 113 corrects the relative position estimate 107 between the receivers 120. The corrected relative position estimate 114 thus indicates a more precise position or range for the receivers. This higher precision position can be used to more accurately guide an aircraft, a vehicle or a person using global navigation satellite system (GNSS) satellites or global positioning system (GPS) satellites.

Indeed, the signal sources 121 may be a set of global navigation satellite system (GNSS) satellites, and the receivers 120 may be a set of GNSS receivers. In other cases, the signal sources 121 may be GPS satellites, while the receivers 120 are GPS receivers. The principles described herein may be applied in many different source-receiver scenarios, and are not limited to the specific embodiments described above.

The corrected estimate of the relative position 114 between the receivers 120 may be implemented in a safety-of-life application such as a navigation application. For example, many applications rely on positioning instruments (e.g. 120 and 121) for guidance through physical space. Such is the case for flight navigation systems for aircraft, ground-based augmentation systems, road-based navigation system for vehicles or other systems that rely on properly calibrated signal sources and receivers. The embodiments herein allow for reliably accurate and precise range determination, which allows the estimates generated herein to be relied on for safety-of-life applications.

Figure 8:
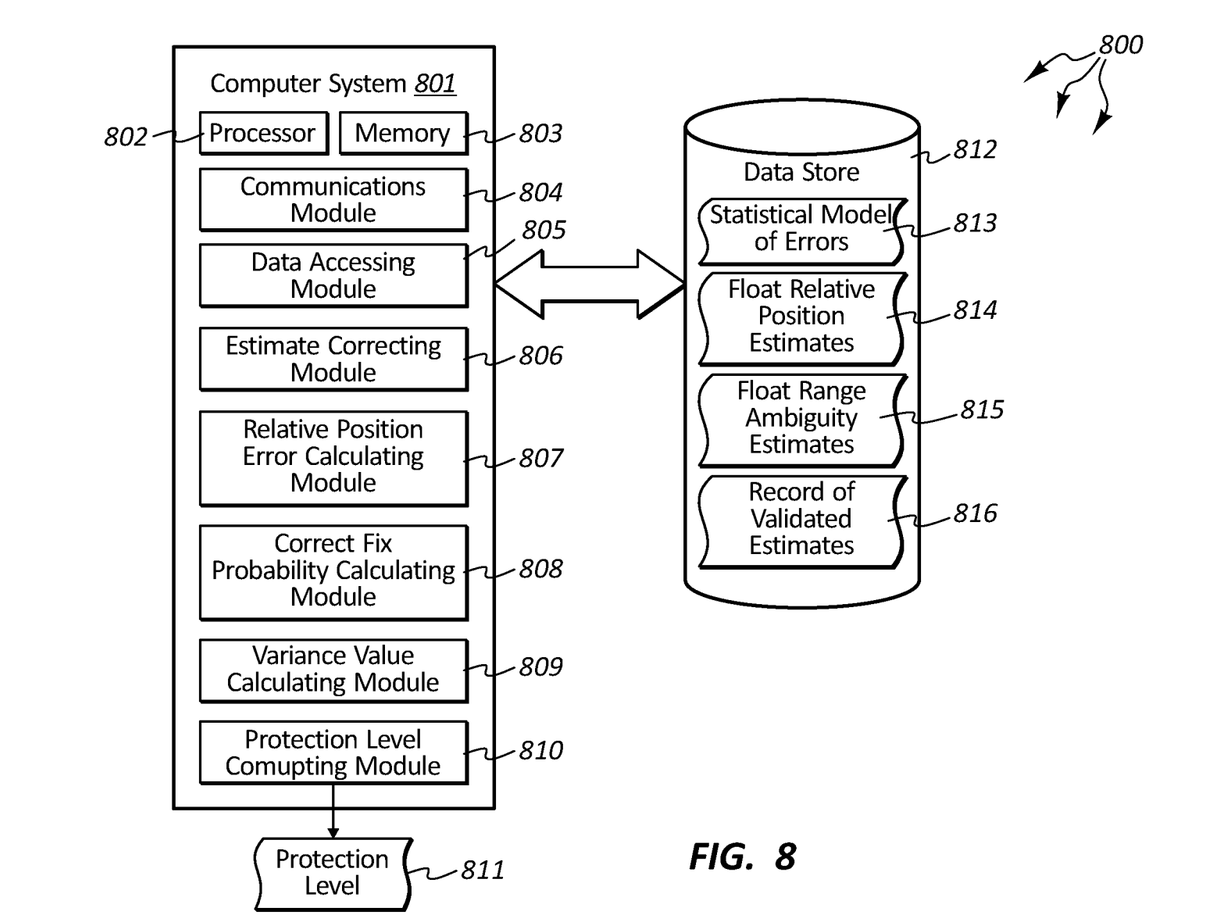
FIG. 8 illustrates a computer architecture in which embodiments described herein may operate including calculating a protection level for use in safety-of-life applications.

Turning now to FIG. 8, a computing environment 800 is provided which includes a computer system 801 and a data store 812. As with the computer system 101 and the data store 115, the computer system 801 may be any type of stationary or mobile computer system, including a PC, laptop, mobile phone, tablet, wearable device, cloud system or any other type of computing device. The data store 812 may be any type of data storage, whether local or remote. Each module may be embodied in different hardware and/or software, or may be included in the same computer system. The computer system 801 includes at least one hardware processor 802, memory 803 and a communications module 804. Other modules will be described in conjunction with method 900 of FIG. 9.

Indeed, FIG. 9 illustrates a flowchart of a method 900 for calculating a protection level for use in safety-of-life applications. The method 900 will now be described with frequent reference to the components and data of environment 800 of FIG. 8.

Method 900 includes accessing a statistical model of errors in one or more float relative position estimates and one or more float range ambiguity estimates (910). For example, data accessing module 805 of computer system 801 may access statistical model of errors 813 in data store 812. The statistical model of errors 813 may include information for float relative position estimates 814 and float range ambiguity estimates 815. These estimates represent determinations of relative position of receivers and signal sources, and range ambiguities that occur after double-differencing is performed.

The data accessing module 805 also accesses ambiguity residual values each representing the difference between a float range ambiguity estimate and a fixed range ambiguity estimate (920), and further accesses various float relative position estimates 814 (930). The data accessing steps may be performed sequentially or in parallel. Once the data has been accessed, the estimate correcting module 806 of computer system 801 may correct the accessed float relative position estimate 814 based on a calculated difference between the float range ambiguity estimates and the fixed range ambiguity estimates (940).

The data accessing module 805 may then access a record 816 of which fixed range ambiguity estimates have been validated (950) (e.g. in step 760 of FIG. 7). Then, knowing which fixed range ambiguity estimates have been validated, the relative position error calculating module 807 may calculate a relative position error caused by the fixed range ambiguity estimates that were recorded to be invalid (960). Any invalidated fixed range ambiguity estimates may be left as floating point values, or may be rounded to the nearest integer.

Once this relative position error is known, the correct fix probability calculating module 808 can calculate the a posteriori probability of correct fix of the fixed range ambiguity estimates based on the size of the calculated difference between the float range ambiguity estimate and the fixed range ambiguity estimates and corresponding variances in the accessed statistical model (970). The a posteriori probability calculation indicates whether the correction made by the estimate correcting module 806 was proper or improper. The corrected float relative position estimate 814 may now, after correction, have an associated variance value.

The variance value calculating module 809 may calculate a variance value for the corrected float relative position estimate (980), after which the protection level computing module 810 computes a protection level 811 indicating that the probability that the error in the corrected relative position estimate exceeds the protection level is less than a specified amount (990). In this manner, the calculated protection level 811 can indicate that the error in the corrected relative position estimate will not exceed that protection level, at least to a very high degree of likelihood. The protection level may be calculated based on multiple elements including the relative position error, the calculated a posteriori correct fix of the fixed range ambiguity estimates, and/or the calculated variance value of the fixed relative position estimate.

If, for some reason, the computer system 801 determines that the protection level is less than the specified limit, the computer system can implement communications module 804 to notify other entities or software applications that the specified limit has been satisfied. If the computer system 801 determines that the protection level is more than the specified limit, the notification may be sent to safety-of-life applications indicating that the fixed position estimate is likely wrong and should be disregarded.

Thus, solutions and embodiments are provided which set validation thresholds (i.e. integer aperture). Setting validation thresholds ensures that the integer aperture test strictly meets a required probability of correct ambiguity resolution. Existing aperture sizing methods use either a fixed threshold for all requirements, a variable threshold based on approximations to the true risk, or Monte Carlo simulations that are not able to be evaluated in a real time application. Moreover, solutions and embodiments are provided which bound the relative position estimate error induced by partial ambiguity resolution. This allows the use of partially validated subsets of the integer ambiguity sets. These embodiments include the ability to bound the error induced by such non-validated ambiguities for safety-of-life applications.

Accordingly, methods, systems and computer program products are provided which perform integer ambiguity validation in carrier phase differential positioning. Moreover, methods, systems and computer program products are provided which calculate a protection level for use in safety-of-life applications including aircraft navigation systems.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A method, implemented at a computer system that includes at least one processor, for performing integer ambiguity validation in carrier phase differential positioning, the method comprising:
   accessing a set of double-differenced pseudorange measurements of the ranges between a set of signal sources and a set of two or more receivers, the signal sources and the receivers using a carrier signal having a specified wavelength;
   accessing a set of double-differenced carrier phase measurements of the changes in range between the signal sources and the receivers with range ambiguities that are integer multiples of the wavelength of the carrier signal;
   combining the accessed pseudorange measurements and the carrier phase measurements, wherein the combination results in an estimate of the relative position between the receivers and float range ambiguity estimates that are not integer multiples of the wavelength of the carrier signal;
   performing integer bootstrapping to produce fixed range ambiguity estimates that are integer multiples of the wavelength of the carrier signal;
   establishing a validation threshold based on a statistical model of the pseudorange measurements and of the carrier phase measurements that ensures that a specified probability of correct ambiguity resolution is met;
   initiating a data-driven validation on the difference between the float range ambiguity estimates and the fixed range ambiguity estimates to validate the correctness of the fixed range ambiguity estimates; and
   upon determining that the fixed range ambiguity estimates are valid, correcting the estimate of the relative position between the receivers.

2. The method of claim 1, wherein the signal sources comprise a set of global navigation satellite system (GNSS) satellites, and the receivers comprise a set of GNSS receivers.

3. The method of claim 1, wherein performing integer bootstrapping comprises accessing an error model to determine which float range ambiguity estimate value has the highest confidence level, and iteratively rounding the most confident float range ambiguity estimate value to the nearest integer and conditioning the remaining range ambiguity estimates starting with the estimate value with the highest determined confidence level.

4. The method of claim 3, wherein conditioning comprises updating later float range ambiguity estimates based on the previously rounded integer values resulting from integer bootstrapping.

5. The method of claim 1, wherein validating the correctness of the range ambiguity estimates comprises performing a statistical test to determine the probability of incorrectly rounding a selected integer.

6. The method of claim 5, wherein the statistical test is performed based on a multivariate Gaussian distribution.

7. The method of claim 1, wherein each range ambiguity value is assigned its own validation threshold value.

8. The method of claim 7, further comprising accessing a specified total risk value for integer range ambiguity validations that are to be performed in a safety-of-life application.

9. The method of claim 8, further comprising allocating a portion of the accessed total risk value to each fixed range ambiguity estimate.

10. The method of claim 9, wherein the validation threshold is determined sequentially for each accessed ambiguity residual value according to a modeled variance value and the allocated portion of the total risk.

11. One or more computer-readable media that store computer-executable instructions which, when executed, implement a method for calculating a protection level for use in safety-of-life applications, the method comprising:
   accessing a statistical model of errors in one or more float relative position estimates and one or more float range ambiguity estimates;
   accessing one or more ambiguity residual values each representing the difference between a float range ambiguity estimate and fixed range ambiguity estimate;
   accessing one or more float relative position estimates;
   correcting the accessed float relative position estimate based on a calculated difference between the float range ambiguity estimates and the fixed range ambiguity estimates;
   accessing a record of which fixed range ambiguity estimates have been validated;
   calculating a relative position error caused by the fixed range ambiguity estimates that were recorded to be invalid;
   calculating the a posteriori probability of correct fix of the fixed range ambiguity estimates based on the size of the calculated difference between the float range ambiguity estimate and the fixed range ambiguity estimates and corresponding variances in the accessed statistical model;
   calculating a variance value for the corrected float relative position estimate; and
   computing a protection level indicating that the probability that the relative position error for the corrected float relative position estimate exceeds the protection level is less than a specified amount.

12. The computer-readable media of claim 11, wherein the protection level is calculated based on the relative position error, the calculated a posteriori correct fix of the fixed range ambiguity estimates, and the calculated variance value of the fixed relative position estimate.

13. The computer-readable media of claim 11, wherein the invalidated fixed range ambiguity estimates are left as floating point values or are rounded to the nearest integer.

14. The computer-readable media of claim 11, wherein upon determining that the protection level is less than the specified limit, notifying one or more entities or applications that the specified limit has been satisfied.

15. The computer-readable media of claim 11, wherein upon determining that the protection level is more than the specified limit, generating a notification for a safety-of-life application indicating that the fixed position estimate is likely wrong.

16. A computer system comprising the following:
   one or more processors;
   a data accessing module configured to:
      access a set of double-differenced pseudorange measurements of the ranges between a set of signal sources and a set of two or more receivers, the signal sources and the receivers using a carrier signal having a specified wavelength; and access a set of double-differenced carrier phase measurements of the changes in range between the signal sources and the receivers with range ambiguities that are integer multiples of the wavelength of the carrier signal;

a measurement combining module configured to combine the accessed pseudorange measurements and the carrier phase measurements, wherein the combination results in an estimate of the relative position between the receivers and float range ambiguity estimates that are not integer multiples of the wavelength of the carrier signal;

a bootstrapping module configured to perform integer bootstrapping to produce fixed range ambiguity estimates that are integer multiples of the wavelength of the carrier signal;

a threshold establishing module configured to establish a validation threshold based on a statistical model of the pseudorange measurements and of the carrier phase measurements that ensures that a specified probability of correct ambiguity resolution is met;

a validator configured to perform a data-driven validation on the difference between the float range ambiguity estimates and the fixed range ambiguity estimates to validate the correctness of the fixed range ambiguity estimates; and a correction module configured to correct the estimate of the relative position between the receivers upon determining that the fixed range ambiguity estimates are valid.

17. The computer system of claim 16, wherein the corrected estimate of the relative position between the receivers is implemented in a safety-of-life navigation application.

18. The computer system of claim 17, wherein the safety-of-life navigation application comprises a flight navigation system for aircraft.

19. The computer system of claim 17, wherein the safety-of-life navigation application comprises a ground-based augmentation system.

20. The computer system of claim 17, wherein the safety-of-life navigation application comprises a road-based navigation system for vehicles.

* * * * *